Jan. 8, 1935.  G. SOULAT  1,987,495
SAFETY CIRCUIT BREAKER FOR AUTOMOBILE VEHICLES
Filed April 16, 1934   4 Sheets-Sheet 1
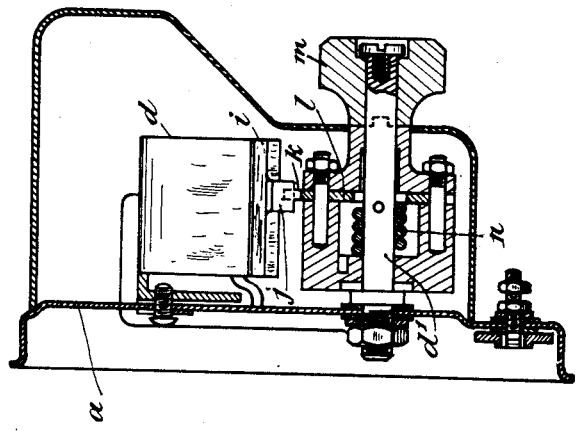
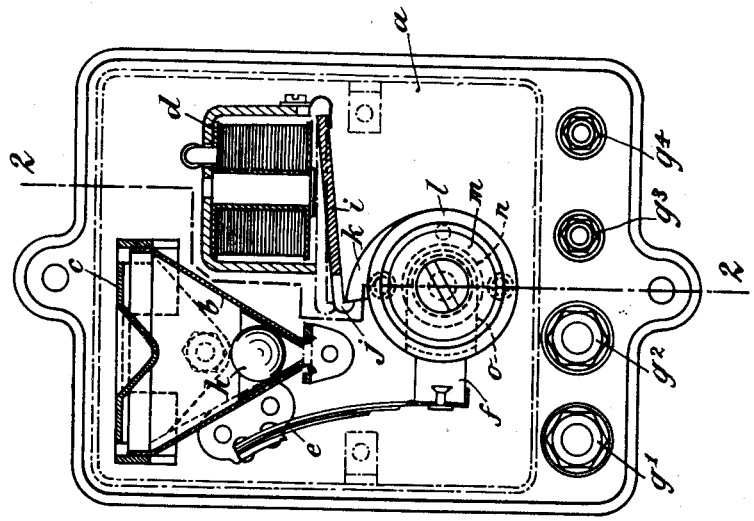
GEORGES SOULAT
INVENTOR
BY
his Atty.

Jan. 8, 1935.   G. SOULAT.   1,987,495
SAFETY CIRCUIT BREAKER FOR AUTOMOBILE VEHICLES
Filed April 16, 1934   4 Sheets-Sheet 2
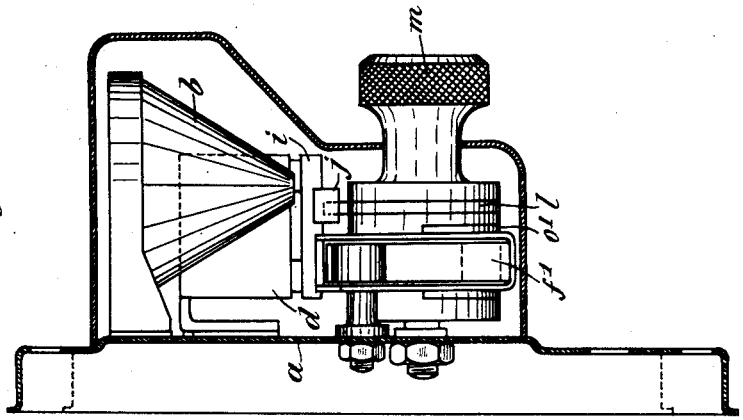
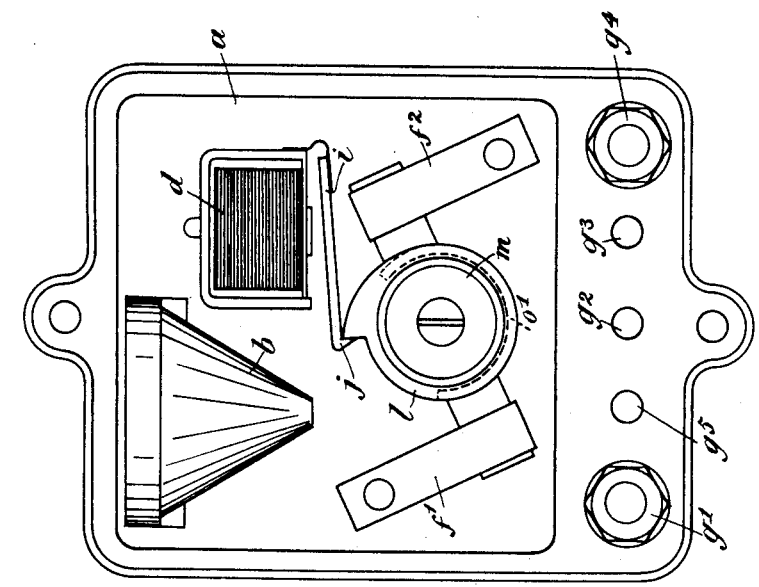
GEORGES SOULAT
INVENTOR
By
his Atty.

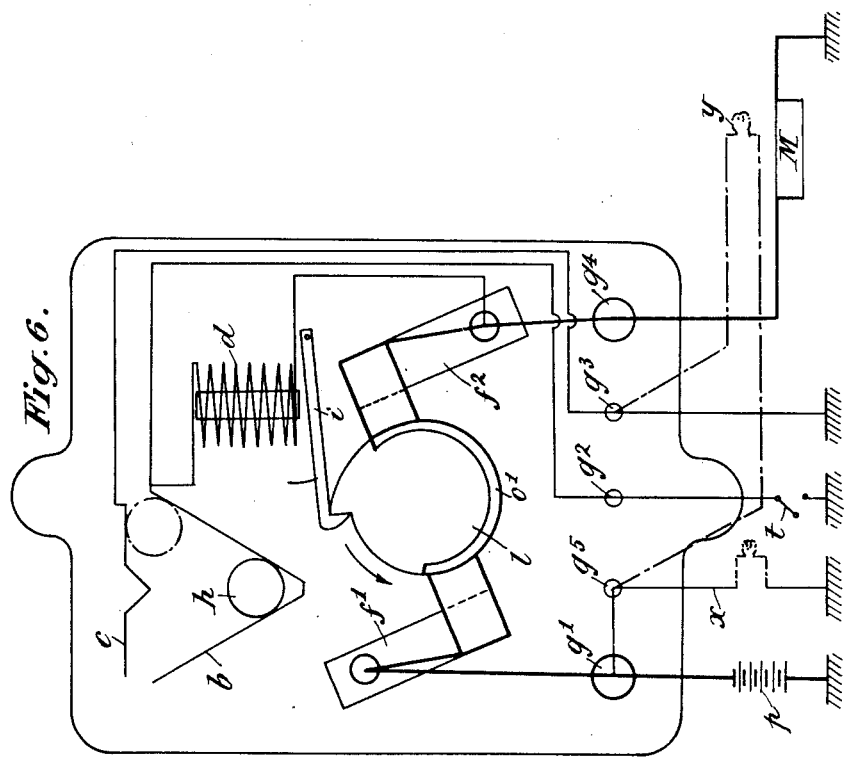
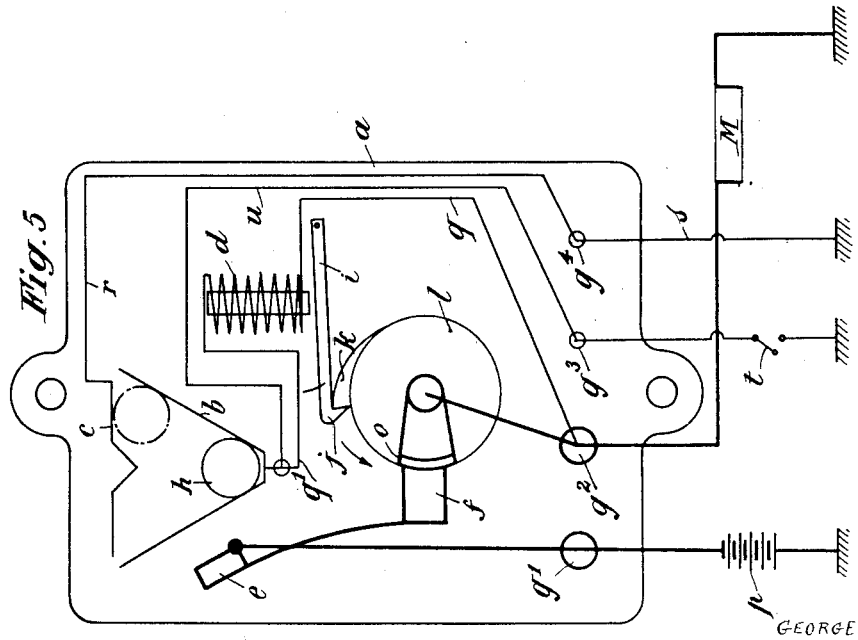

Patented Jan. 8, 1935

1,987,495

UNITED STATES PATENT OFFICE 1,987,495

SAFETY CIRCUIT BREAKER FOR AUTOMOBILE VEHICLES

Georges Soulat, La Guerche sur-l'Aubois, France

Application April 16, 1934, Serial No. 720,754
In France November 9, 1933

3 Claims. (Cl. 180—82)

There exist safety apparatus for automobile vehicles which are adapted to connect the primary circuit of the magneto to the frame or cut off this circuit when, due to an accident, the car is turned on one side or upside down.

This action of connecting the circuit to the frame prevents sparks from being produced by the plugs and avoids any danger of fire.

The object of the present invention is to provide a safety circuit breaker adapted to work automatically under the conditions above stated and in which the breaking of the primary circuit is obtained through the action of an electro-magnet the circuit of which includes a movable contact such as a ball acting by gravity and so arranged that under normal conditions the circuit of the electro-magnet is open and that the movable armature of said electro-magnet is engaged with a switch controlling the primary circuit so as to normally maintain said circuit closed. This ball (or movable contact of any other kind) is moved under the action of gravity when the car, undergoing an accident, is turned either on one side or upside down, then closing the circuit of the electro-magnet and causing the switch that controls the primary circuit to be released, so that current is cut off in said primary circuit.

In a first embodiment of my invention, the switch through which the primary circuit is controlled consists of a disc provided with a pawl and with a contact against which a brush electrically connected to said primary circuit is normally applied.

In another embodiment, the disc provided with a pawl is located between two brushes and carries along its periphery a connecting arc-shaped element which, in the normal position of said disc, establishes an electric connection between these discs.

According to another embodiment, which is intended to simplify the manufacture and to reduce the cost of the apparatus, while improving the working of the safety circuit-breaker, the movable contact consists of a pendular mass, connected to the frame of the vehicle and which, in case of an accident occurring, is brought into contact with a stationary terminal, consisting for instance of a metallic ring electrically connected to the electric circuit of the electro-magnet through which the switch is controlled.

Preferred embodiments of the present invention will be hereinafter described, with reference to the accompanying drawings, given merely by way of example, and in which:

Fig. 1 is a front view of the circuit-breaker having only one brush, the casing thereof being removed;

Fig. 2 is a sectional view on the line 2—2 of Fig. 1;

Fig. 3 is a front view similar to Fig. 1 but corresponding to another embodiment;

Fig. 4 is a side elevational view corresponding to Fig. 3, the casing being shown in section;

Figs. 5 and 6 are diagrammatical views of the electrical connections corresponding to the embodiments of Figs. 1 and 3 respectively;

Figure 7:
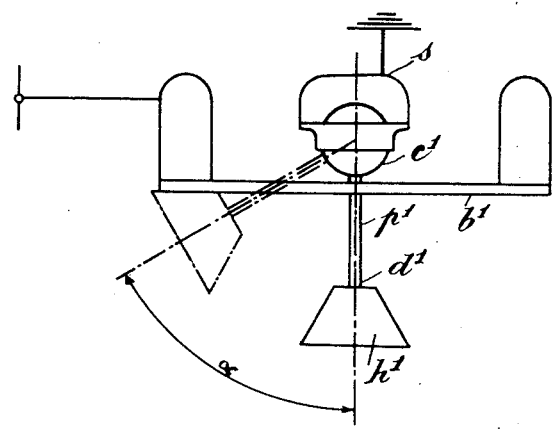
Fig. 7 is a front view of the pendular arrangement used according to another embodiment.

As shown in Figs. 1 and 2, the automatic safety circuit breaker according to the present invention includes a plate $a$ fixed in a vertical position on the automobile vehicle. On this plate are fixed the following elements:

(a) a funnel or conical shaped piece $b$ electrically insulated from its cover $c$;

(b) an electro-magnet $d$;

(c) a spindle $d^1$;

(d) a flexible blade $e$ supporting a brush $f$;

(e) contacts $g^1$ $g^2$ $g^3$ $g^4$;

A ball $h$ rests upon the bottom of funnel $b$. Furthermore, the movable armature $i$ of the electro-magnet $d$ has its end or nose $j$ engaged with a pawl $k$ carried by a disc $l$ adapted to turn about spindle $d^1$. This disc can be turned in a clockwise direction by means of a button $m$ (Fig. 2) against the action of a return spring $n$. When the pawl is released by the armature of the electro-magnet, this disc therefore turns in an anti-clockwise direction under the action of spring $n$. Disc $l$ carries a contacting sector $o$ against which brush $f$ is normally applied.

The electric connections are devised as shown in the diagram of Fig. 5, in which the primary circuit has been shown in heavy lines, while the circuit through which the electro-magnet is fed with current and which includes the ball contact is shown in fine lines.

Terminal $g^1$ is connected with the wire leading to the battery $p$, while terminal $g^2$ is connected to the wire through which current is fed to the ignition circuit of the engine.

Furthermore, connections are provided, on the rear face of plate $a$ between terminal $g^1$ and the brush carrier $e$ and between the central portion of sector $o$ and terminal $g^2$. The last mentioned contact is also connected through a wire $q$ with one of the terminals of electro-magnet $d$, the other end of which is connected at $q^1$ to funnel $b$. The cover $c$ of said funnel is connected through a wire $r$ to terminal $g^4$ to which leads a wire connected to the metallic frame of the vehicle.

Finally terminal $g^3$ may be connected with one terminal of a hand-switch $t$ placed on the instrument board of the vehicle, the other terminal of said switch being connected to the metallic frame of said vehicle. This terminal $g^3$ is also connected through a wire $u$ to one end of the electro-magnet $d$, so that it is possible to cut off the current in the primary circuit, by acting on said switch $t$, if so desired.

The safety switch being in the position shown in Figs. 1, 2 and 5, that is to say the pawl $k$ of disc $l$ being engaged with the armature $i$ of the electro-magnet, so that spring $n$ has been deformed, electric current flows in the primary circuit shown in heavy lines in Fig. 5 and feed the engine, diagrammatically shown at M, in the usual manner, while the feed circuit of electro-magnet $d$ is opened, due to funnel shaped member $b$ being insulated from cover $c$.

When the car is overturned, ball $h$ comes by gravity into contact with cover $c$, as shown in dotted lines in Fig. 5, thus closing the circuit shown in fine lines in Fig. 5, electric current being immediately caused to flow through electro-magnet $d$. The armature $i$ of this electro-magnet is attracted, as shown in dotted lines in Fig. 1 and the nose $j$ thereof is disengaged from with pawl $k$. Under the action of spring $n$, disc $l$, which carries contact $o$, moves angularly in an anticlockwise direction and the current of the primary circuit is cut off between contact $o$ and brush $f$.

In order to reset the circuit breaker into its operative position, it suffices to act on button $m$ so as to bring back pawl $k$ into its position in which it is engaged with the nose $j$ of armature $i$.

In the other embodiment shown in Figs. 3, 4 and 6, the arrangement is analogous, but the primary circuit includes two brushes $f^1$ and $f^2$ which, in the normal position of the apparatus, are connected together by a contact piece $o^1$ carried by disc $l$.

It will be readily understood that when, due to an accident, the car is overturned, the circuit through which the electro-magnet can be fed is closed by ball $h$ and the disc $l$ that carries contact $o^1$ no longer establishes a connection through said contact between brushes $f^1$ and $f^2$, due to said disc being released and caused to turn by the spring. Current is then cut off in the primary circuit.

Figure 8:
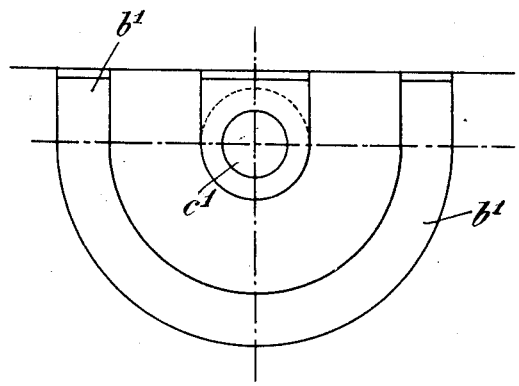
Fig. 8 is a plan view corresponding to Fig. 7.

According to a second modification, as shown in Figs. 7 and 8, a pendular contact is formed by a mass $h^1$ of frusto-conical shape fixed at the lower end $d^1$ of a rod $p^1$ supported by the board of the vehicle through a ball and socket joint $c^1$, said joint being electrically connected to the frame of the vehicle through a wire $s$. Concentrically with the ball and socket joint and at a slightly lower level, there is provided a semi-circular metallic band $b^1$ forming a fixed contact, the bent ends of which serve to fix said band to the instrument board of the vehicle. This band is connected, through electrical connections arranged as shown in the diagrams of Figs. 5 or 6, on the one hand to the release electro-magnet $d$ and, on the other hand, to the hand switch $t$.

When the car is accidentally overturned, the mass $h^1$ of frusto-conical shape, which was in the position shown in solid lines in Fig. 7, pivots about the ball and socket joint and comes into contact with band $b^1$ by pivoting through an angle $\alpha$ as shown in dotted lines in Fig. 7 and current is immediately set up in the secondary circuit which feeds electro-magnet $d$. The apparatus then works as above described.

Owing to the frusto-conical shape given to the pendular mass, the contact takes place along a line instead of taking place between two points, so that there are less risks of the release not taking place.

Figure 9:
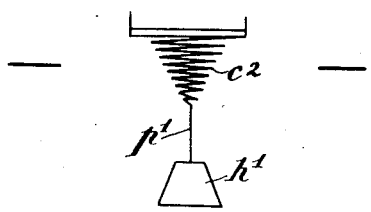
Fig. 9 shows still another embodiment.

In the modification shown in Fig. 9, the ball and socket joint may be replaced by a conical spring $c^2$ the lower end of which is connected through a rod $p^1$ with mass $h^1$.

Of course the embodiments above described have been given merely by way of example. They may include additional features. For instance, I may provide on the board of the safety circuit-breaker a fifth terminal $g^5$, as shown in Fig. 6, electrically connected with terminal $g^1$ and also to a wire $x$ serving to feed current to the lighting system, the latter being independent of the main feed circuit which can be cut off by the circuit breaker above described, since the main lighting circuit or other apparatus can be also a cause of fire in case of the electric wires being torn and accidentally connected with the frame due to an accident. A hanging lamp $y$ might also be connected between terminals $g^3$ and $g^5$.

While I have described what I deem to be preferred embodiments of my invention, it should be well understood that I do not wish to be limited thereto as there might be changes made in the arrangement, disposition and form of the parts without departing from the principle of my invention as comprehended within the scope of the appended claims.

What I claim is:

1. In an automobile vehicle including an electric circuit, a safety apparatus for breaking said circuit in case of the vehicle overturning, which comprises in combination, a switch for controlling said circuit, a spring tending to bring said switch into the position in which it cuts off current in said circuit, movable locking means for keeping said switch in the position in which it closes said circuit, an auxiliary circuit, an electro-magnet in said auxiliary circuit adapted to release said switch from the action of said locking means when current is flowing through said auxiliary circuit, and means movable by gravity for keeping said auxiliary circuit open when the vehicle is in normal position and closing said auxiliary circuit when the vehicle is overturned.

2. In an automobile vehicle including an electric circuit, a safety apparatus for breaking said circuit in case of the vehicle overturning, which comprises in combination, a switch for controlling said circuit including a rotatable disc, an electricity conducting sector carried by said disc and electrically connected with said circuit, a brush electrically connected with said circuit applied against said disc, a spring tending to bring said disc into the position in which said brush is out of contact with said sector, movable locking means for keeping said disc in the position in which said brush is in contact with said sector, an auxiliary circuit, an electro-magnet in said auxiliary circuit adapted to release said disc from the action of said locking means when current flows through said auxiliary circuit, and means movable by gravity for keeping said auxiliary circuit open when the vehicle is in normal position and closing said auxiliary circuit when the vehicle is overturned.

3. In an automobile vehicle including an electric circuit, a safety apparatus for breaking said circuit in case of the vehicle overturning, which comprises in combination, a rotatable disc, an electricity conducting sector carried by said disc, two brushes connected with said circuit applied against said disc, a spring tending to bring said disc into the position in which both brushes are not simultaneously in contact with said sector, movable locking means for keeping said disc in the position in which said brushes are both in contact with said sector, an auxiliary circuit, an electro-magnet in said auxiliary circuit adapted to release said disc from the action of said locking means when current flows through said auxiliary circuit, and means movable by gravity for keeping said auxiliary circuit open when the vehicle is in normal position and closing said auxiliary circuit when the vehicle is overturned.

GEORGES SOULAT.